US012223933B2

(12) United States Patent
Mamori et al.

(10) Patent No.: US 12,223,933 B2
(45) Date of Patent: Feb. 11, 2025

(54) ELECTRONIC MUSICAL APPARATUS, STORAGE MEDIUM STORING RECORDING/REPRODUCTION PROGRAM, AND RECORDING/REPRODUCTION METHOD

(71) Applicant: Roland Corporation, Shizuoka (JP)

(72) Inventors: Hideyuki Mamori, Shizuoka (JP); Shinya Kondo, Shizuoka (JP); Yasuhisa Umano, Shizuoka (JP)

(73) Assignee: Roland Corporation, Shizuoka (JP)

(*) Notice: Subject to any disclaimer, the term of this patent is extended or adjusted under 35 U.S.C. 154(b) by 754 days.

(21) Appl. No.: 17/469,851

(22) Filed: Sep. 8, 2021

(65) Prior Publication Data

US 2022/0084490 A1 Mar. 17, 2022

(30) Foreign Application Priority Data

Sep. 11, 2020 (JP) ................................ 2020-152541

(51) Int. Cl.
*G10H 1/00* (2006.01)

(52) U.S. Cl.
CPC ......... *G10H 1/0066* (2013.01); *G10H 1/0008* (2013.01); *G10H 2210/076* (2013.01); *G10H 2210/391* (2013.01)

(58) Field of Classification Search
CPC ............... G10H 1/0066; G10H 1/0008; G10H 2210/076; G10H 2210/391
USPC ........................................................... 84/603
See application file for complete search history.

(56) References Cited

U.S. PATENT DOCUMENTS

| | | | | |
|---|---|---|---|---|
| 6,087,578 A * | 7/2000 | Kay | G10H 7/002 | 84/626 |
| 2012/0097014 A1* | 4/2012 | Matsumoto | G10H 1/36 | 84/634 |
| 2013/0047821 A1* | 2/2013 | Okazaki | G10H 1/38 | 84/605 |
| 2016/0372096 A1* | 12/2016 | Lyske | G10H 1/368 | |
| 2019/0118096 A1* | 4/2019 | Jeon | A63F 13/2145 | |
| 2021/0065665 A1* | 3/2021 | Yamada | G10H 1/40 | |

(Continued)

FOREIGN PATENT DOCUMENTS

| | | | |
|---|---|---|---|
| EP | 1930877 B1 * | 11/2015 | G10H 1/0008 |
| JP | 4107212 B2 * | 6/2008 | G10H 1/0066 |

(Continued)

*Primary Examiner* — Christina M Schreiber
(74) *Attorney, Agent, or Firm* — JCIPRNET

(57) ABSTRACT

There are provided an electronic musical apparatus, a storage medium storing a recording/reproduction program, and a recording/reproduction method capable of outputting a musical sound phrase and a rhythm phrase after the input musical sound phrase is output. In a case where a recording button is operated, a looper starts to record musical sounds. In this case, the musical sounds (that is, a musical sound phrase) that are being recorded are output from a speaker. Thereafter, in a case where a loop reproduction button is operated, the recording is stopped, and loop reproduction of the recorded musical sound phrase and a rhythm phrase is started. Consequently, it is possible to output musical sounds in which the musical sound phrase and the rhythm phrase are loop-reproduced after the input musical sound phrase is output.

18 Claims, 10 Drawing Sheets

(56) References Cited

U.S. PATENT DOCUMENTS

| | | | | |
|---|---|---|---|---|
| 2022/0084490 | A1* | 3/2022 | Mamori | G10H 1/0008 |
| 2022/0238088 | A1* | 7/2022 | Danjyo | G10H 1/34 |

FOREIGN PATENT DOCUMENTS

| | | | | |
|---|---|---|---|---|
| JP | 2012093491 | | 5/2012 | |
| JP | 2012093491 | A * | 5/2012 | G10H 1/0033 |

* cited by examiner

Tempo table 11b

| Number of bars \ Tempo | 80 | 81 | ·· | 120 | ·· | 159 | 160 |
|---|---|---|---|---|---|---|---|
| 1 | 3.00 | 2.96 | ·· | 2.00 | ·· | 1.51 | 1.50 |
| 2 | 6.00 | 5.93 | ·· | 4.00 | ·· | 3.02 | 3.00 |
| 3 | 9.00 | 8.89 | ·· | 6.00 | ·· | 4.53 | 4.50 |
| 4 | 12.00 | 11.85 | ·· | 8.00 | ·· | 6.04 | 6.00 |
| 5 | 15.00 | 14.81 | ·· | 10.00 | ·· | 7.55 | 7.50 |
| 6 | 18.00 | 17.78 | ·· | 12.00 | ·· | 9.06 | 9.00 |
| 7 | 21.00 | 20.74 | ·· | 14.00 | ·· | 10.57 | 10.50 |
| 8 | 24.00 | 23.70 | ·· | 16.00 | ·· | 12.08 | 12.00 |
| : | : | : | ·· | : | ·· | : | : |

FIG. 5(a)

Rhythm pattern table 11c

| No. | Bar | Beat position | TICK value | High hat | Snare drum | Bass drum | ·· |
|---|---|---|---|---|---|---|---|
| 1 | 1 | 1 | 0 | ● | | ● | ·· |
| | | 2 | 96 | ● | ● | | ·· |
| | | 3 | 192 | ● | | ● | ·· |
| | | 4 | 288 | ● | ● | | ·· |
| | | — | 383 | Terminal end | Terminal end | Terminal end | ·· |
| 2 | 1 | 1 | 0 | ● | | ● | ·· |
| | | 2 | 96 | | ● | ● | ·· |
| | | 3 | 192 | ● | | ● | ·· |
| | | 4 | 288 | | ● | ● | ·· |
| | | — | 383 | Terminal end | Terminal end | Terminal end | ·· |
| : | : | : | : | : | : | : | ·· |
| 10 | 1 | 1 | 0 | ● | | ● | ·· |
| | : | : | : | : | : | : | ·· |
| | 2 | 1 | 384 | | ● | ● | ·· |
| | : | : | : | : | : | : | ·· |
| | 3 | 1 | 768 | ● | ● | | ·· |
| | : | : | : | : | : | : | ·· |
| | 4 | 1 | 1152 | ● | | ● | ·· |
| | : | : | : | : | : | : | ·· |
| : | : | : | : | : | : | : | ·· |

FIG. 5(b)

ELECTRONIC MUSICAL APPARATUS, STORAGE MEDIUM STORING RECORDING/REPRODUCTION PROGRAM, AND RECORDING/REPRODUCTION METHOD

CROSS-REFERENCE TO RELATED APPLICATION

This application claims the priority benefits of Japan Patent Application No. 2020-152541, filed on Sep. 11, 2020. The entirety of the above-mentioned patent application is hereby incorporated by reference herein and made a part of this specification.

BACKGROUND

Technical Field

The disclosure relates to an electronic musical apparatus, a storage medium storing a recording/reproduction program, and a recording/reproduction method.

Description of Related Art

Generally, there is an electronic musical apparatus that loop-reproduces a rhythm pattern or MIDI data (hereinafter, referred to as a "rhythm phrase") formed of bar units at a desired tempo, and loop-reproduces data in which a phrase based on musical sounds (hereinafter, referred to as a "musical sound phrase") played in accordance with the reproduction of the rhythm phrase is stored for a predetermined time. Consequently, musical sounds obtained by superimposing the musical sound phrase and the rhythm phrase are loop-reproduced without a performer repeatedly playing the musical sound phrase, and thus the performer can further perform his/her own performance with the musical sound phrase and the rhythm phrase as an accompaniment.

For example, in an electronic musical apparatus in Patent Document 1, at the same time as reproduction of a rhythm phrase is started, an input musical sound phrase from a keyboard 16 or an external MIDI device 43 is recorded in a recording memory 13*a*, and the recorded musical sound phrase is loop-reproduced from the recording memory 13*a*. Consequently, musical sounds obtained by superimposing a musical sound phrase and the rhythm phrase are loop-reproduced without a performer repeatedly playing the musical sound phrase. Therefore, richly expressive musical sounds can be easily output by the performer superimposing another musical sound phrase on the musical sound phrase and the rhythm phrase.

PATENT DOCUMENTS

[Patent Document 1] Japanese Patent Laid-Open No. 2012-93491 (for example, paragraphs 0037 to 0042, and FIG. 4)

However, in the above electronic musical apparatus, since the rhythm phrase is reproduced first, a performer is required to start a performance at the same time as the start of reproduction of the rhythm phrase or at a timing after the start of the reproduction of the rhythm phrase. Therefore, there is a problem in that it is not possible to realize a musical composition in which an intro part at the beginning of a song is played with a guitar only, and an A-melody part after the intro is played by adding not only a guitar performance but also the rhythm phrase.

SUMMARY

The disclosure has been made to solve the above problem, and provides an electronic musical apparatus, a storage medium storing a recording/reproduction program, and a recording/reproduction method capable of outputting a musical sound phrase and a rhythm phrase after the input musical sound phrase is output.

According to an embodiment of the disclosure, there is provided an electronic musical apparatus that records an input musical sound phrase and reproduces the musical sound phrase and a rhythm phrase, the electronic musical apparatus including a timing acquisition part that sequentially acquires a first timing based on an input timing of a first instruction and a second timing based on an input timing of a second instruction after the first timing; and a control part that, at the first timing acquired by the timing acquisition part, starts to record musical sounds, and, at the second timing acquired by the timing acquisition part, determines a phrase based on the musical sounds recorded from the first timing to the second timing as the musical sound phrase, and starts to reproduce the rhythm phrase from a starting end thereof simultaneously with starting to reproduce the musical sound phrase from a starting end thereof.

According to another embodiment of the disclosure, there is provided a storage medium storing a recording/reproduction program causing a computer to record an input musical sound phrase and reproduce the musical sound phrase and a rhythm phrase, the recording/reproduction program causing the computer to execute a timing acquisition step of sequentially acquiring a first timing based on an input timing of a first instruction and a second timing based on an input timing of a second instruction after the first timing; and a recording/reproduction control step of, at the first timing acquired in the timing acquisition step, starting to record musical sounds, and, at the second timing acquired in the timing acquisition step, determining a phrase based on the musical sounds recorded from the first timing to the second timing as the musical sound phrase, and starting to reproduce the rhythm phrase from a starting end thereof simultaneously with starting to reproduce the musical sound phrase from a starting end thereof.

According to still another embodiment of the disclosure, there is provided a recording/reproduction method of recording an input musical sound phrase and reproducing the musical sound phrase and a rhythm phrase, the recording/reproduction method including according to a first operation, starting to record musical sounds, and, according to a second operation, determining a phrase based on the musical sounds recorded from the first operation to the second operation as the musical sound phrase, and starting to reproduce the rhythm phrase from a starting end thereof simultaneously with starting to reproduce the musical sound phrase from a starting end thereof.

BRIEF DESCRIPTION OF THE DRAWINGS

FIG. 5(*a*) is a diagram schematically illustrating a tempo table, and FIG. 5(*b*) is a diagram schematically illustrating a rhythm pattern table.

DESCRIPTION OF THE EMBODIMENTS

Figure 1A:
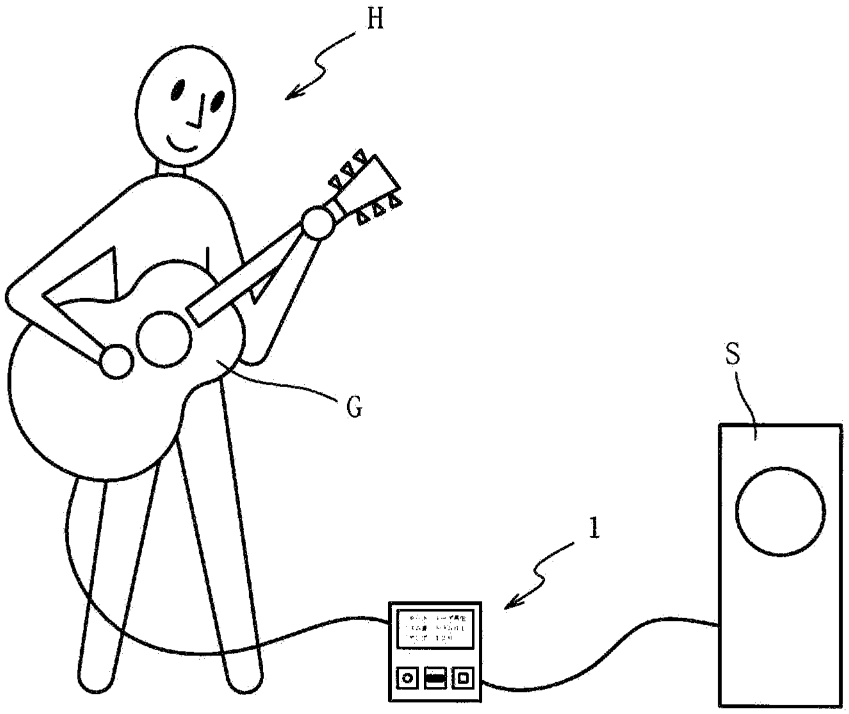
FIG. 1(*a*) is a diagram illustrating a usage form of a looper, and FIG. 1(*b*) is a front view of the looper.
Figure 1B:
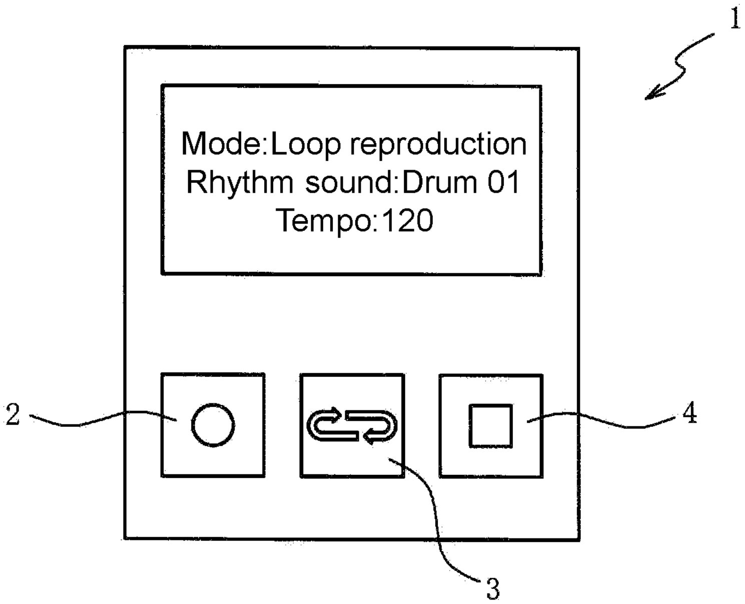

Hereinafter, a preferred embodiment will be described with reference to the accompanying drawings. With reference to FIG. 1, an outline of a looper 1 of the present embodiment will be described. FIG. 1(*a*) is a diagram illustrating a usage form of the looper 1, and FIG. 1(*b*) is a front view of the looper 1. The looper 1 is an electronic musical apparatus that repeatedly reproduces a musical sound phrase P that is a phrase based on musical sounds input from an apparatus such as an electric guitar G according to a performance of a performer H, and a rhythm phrase R that is a phrase based on a high hat, a snare drum, or the like stored in advance from the beginning to a terminal end of each thereof, and outputs the phrases to a speaker S. Hereinafter, repeated reproduction of the musical sound phrase P or the rhythm phrase R from the beginning (starting end) to the terminal end will be referred to as "loop reproduction".

As illustrated in FIG. 1(*b*), the looper 1 has a recording button 2 for starting to record musical sounds, a loop reproduction button 3 for stopping recording of musical sounds and starting loop reproduction of the musical sound phrase P based on the recorded musical sounds and the rhythm phrase R, and a stop button 4 for stopping the loop reproduction of the musical sound phrase P and the rhythm phrase R.

In the present embodiment, the beat of the musical sound phrase P and the rhythm phrase R is set to "four-four beat", and a sampling cycle of the musical sound phrase P is set to "44100 Hz". The beat of the musical sound phrase P and the rhythm phrase R is not limited to "four-four beat", and other beats such as three-four beat and two-four beat may be used. A sampling cycle of the musical sound phrase P is not limited to 44100 Hz, and may be 44100 Hz or higher or 44100 Hz or lower.

Figure 2:
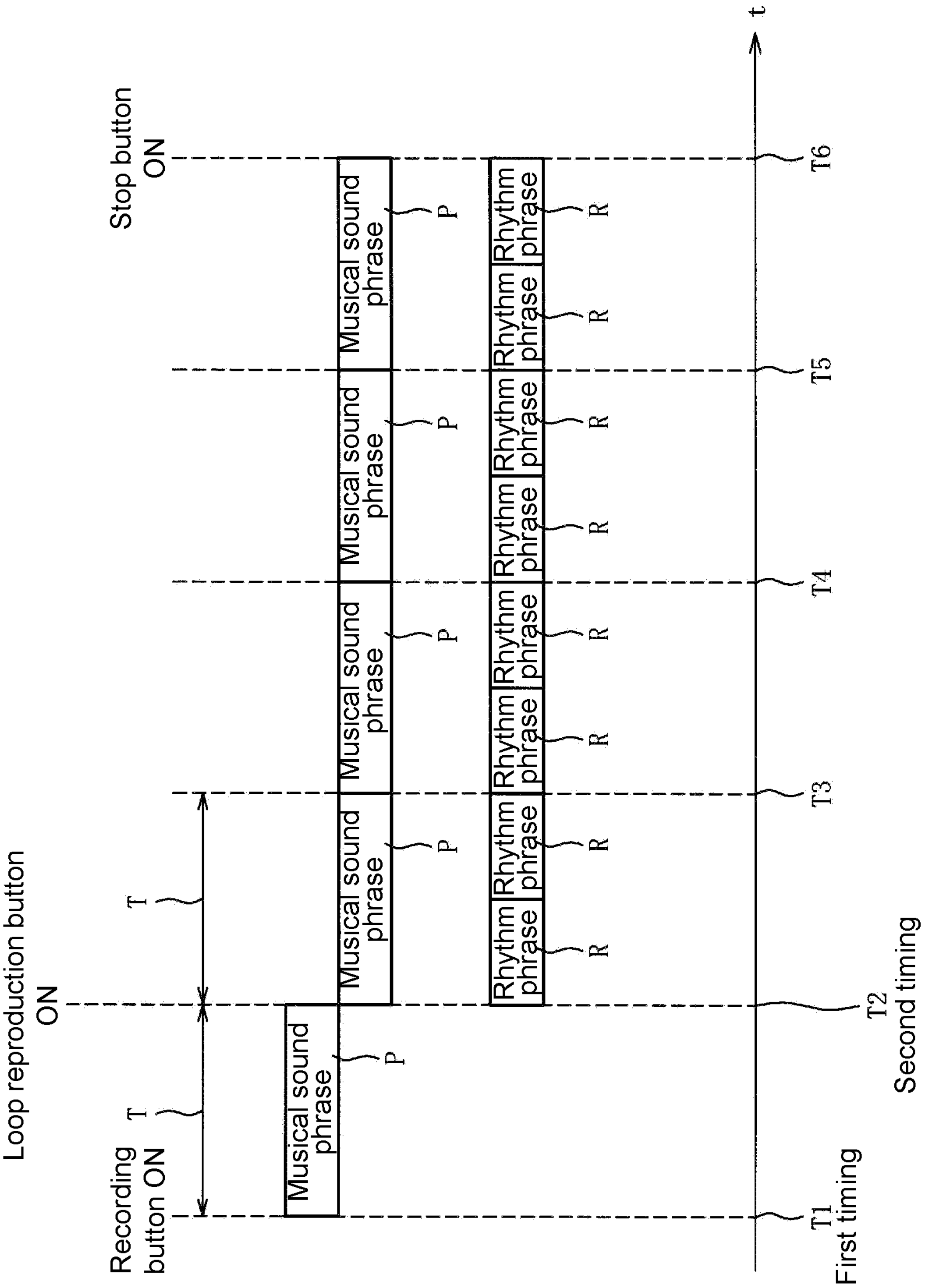
FIG. 2 is a diagram illustrating recording of a musical sound phrase and loop reproduction of the recorded musical sound phrase and a rhythm phrase.

Next, with reference to FIG. 2, recording of the musical sound phrase P in the looper 1 and loop reproduction of the recorded musical sound phrase P and the rhythm phrase R will be described. FIG. 2 is a diagram illustrating recording of the musical sound phrase P and loop reproduction of the recorded musical sound phrase P and the rhythm phrase R. In FIG. 2, the musical sound phrase P is recorded at time points T1 to T2, and the recorded musical sound phrase P and the rhythm phrase R are loop-reproduced at time points T2 to T6.

Specifically, when the recording button 2 is operated (first operation) by the performer H, recording of musical sounds input from the electric guitar G and the like is started (time point T1). In this case, the input musical sound phrase P is recorded, and the musical sound phrase P is also output from the speaker S. Thereafter, when the loop reproduction button 3 is operated (second operation) by the performer H (time point T2), the recording of the musical sounds is stopped. Consequently, a phrase based on musical sounds recorded from time point T1 (first timing) that is an input timing of the recording button 2 to time point T2 (second timing) that is an input timing of the loop reproduction button 3 is determined as the musical sound phrase P. Loop reproduction of the determined musical sound phrase P and the rhythm phrase R is started. In this case, since the timing of the beginning (starting end) at the start of reproduction of the musical sound phrase P and the start of reproduction of the rhythm phrase R are synchronized, it is possible to reduce deviation between the musical sound phrase P and the rhythm phrase R.

Consequently, after the musical sounds (that is, the musical sound phrase P) input from the electric guitar G or the like are output during recording (time points T1 to T2), musical sounds in which the musical sound phrase P and the rhythm phrase R are loop-reproduced can be output (time point T2 onwards). At time points T1 to T2, only the musical sound phrase P is output from the speaker S. Therefore, for example, in a case where the musical sound phrase P is based on a solo performance of the electric guitar G, a melody line of the solo performance can be impressed on an audience. Thereafter, the loop reproduction of the musical sound phrase P and the rhythm phrase R is started, and thus heavy musical sounds of the musical sound phrase P and the rhythm phrase R can be repeatedly output. Consequently, it is possible to output richly expressive musical sounds according to the musical sound phrase P and the rhythm phrase R.

As will be described in detail later, the rhythm phrase R is configured such that a tempo thereof can be changed, and the tempo of the rhythm phrase R is set according to a time over which one loop is reproduced in the musical sound phrase P, that is, a phrase length T that is a time from time point T1 to time point T2. FIG. 2 is an example illustrating a state in which the rhythm phrase R is reproduced at the tempo set according to the phrase length T. A timing of the terminal end of the musical sound phrase P of which the loop reproduction is performed once and a timing of the terminal end of the rhythm phrase R of which the loop reproduction is performed twice can be matched (synchronized) (for example, time points T3, T4, T5, and T6).

Consequently, it is possible to synchronize a timing of any terminal end of loop reproduction of the musical sound phrase P and the rhythm phrase R with a timing of the start of the subsequent loop reproduction, and thus it is possible to output harmonious musical sounds without deviation between the musical sound phrase P and the rhythm phrase R. Since a tempo of the rhythm phrase R is set according to the phrase length T, it is not necessary for the performer H to perform a setting operation related to the tempo of the rhythm phrase R immediately after the recording of the music phrase P by the performer H is finished. Consequently, it is possible to improve operability of the looper 1.

The loop reproduction of the musical sound phrase P and the rhythm phrase R is stopped in a case where the stop button 4 is operated (time point T6).

Figure 3:
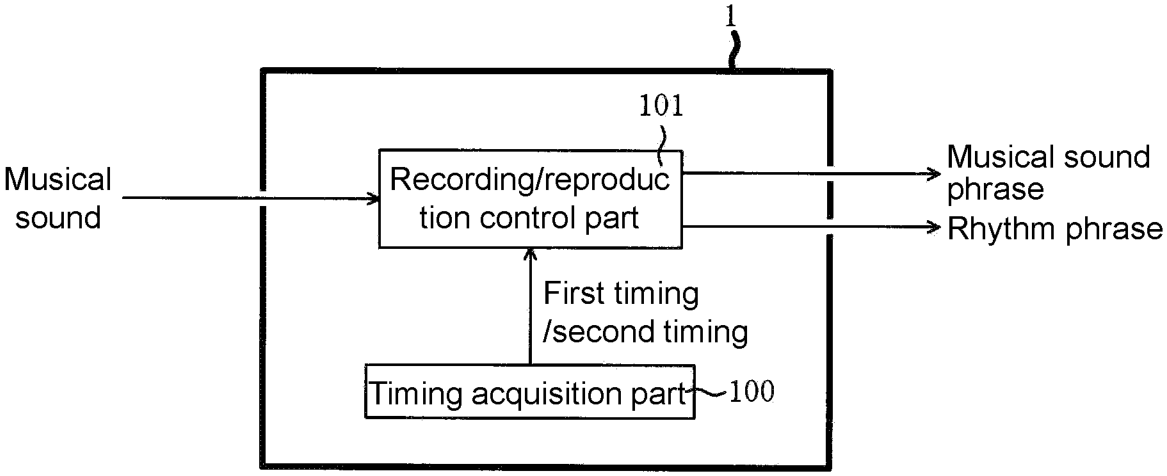
FIG. 3 is a functional block diagram of the looper.

Next, a function of the looper 1 will be described with reference to FIG. 3. FIG. 3 is a functional block diagram of the looper 1. As illustrated in FIG. 3, the looper 1 has a timing acquisition part 100 and a recording/reproduction control part 101. The timing acquisition part 100 is a part that sequentially acquires a first timing based on an input timing of a first instruction and a second timing based on an input timing of a second instruction after the first timing, and is realized by a CPU 10 that will be described later in FIG. 4.

The recording/reproduction control part 101 is a part that starts to record musical sounds at the first timing acquired by the timing acquisition part 100, determines, as the musical sound phrase P, a phrase based on the musical sounds recorded from the first timing to the second timing at the second timing acquired by the timing acquisition part 100, starts to reproduce the musical sound phrase P from the starting end thereof, and also starts to reproduce the rhythm phrase R from the starting end thereof, and is realized by the CPU 10.

In the looper 1, in a case where the first timing is acquired, the input musical sounds (that is, the musical sound phrase P) are output and recorded, and, in a case where the second timing is acquired, reproduction of the recorded musical sound phrase P and reproduction of the rhythm phrase R are started. Consequently, after the input musical sound phrase P is output, the musical sound phrase P and the rhythm phrase R can be reproduced and output.

Figure 4:
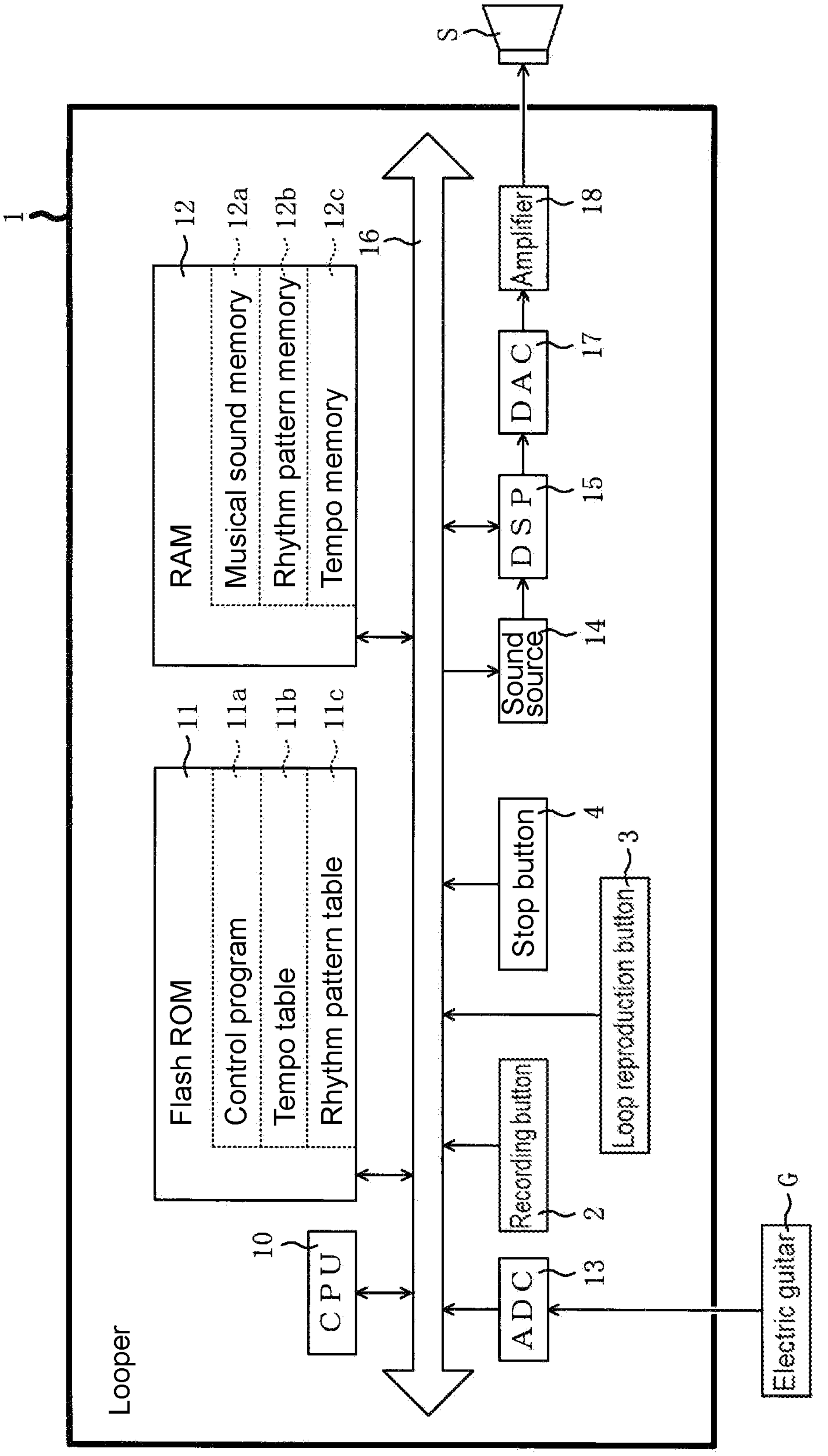
FIG. 4 is a block diagram illustrating an electrical configuration of the looper.

Next, an electrical configuration of the looper 1 will be described with reference to FIGS. 4 and 5. FIG. 4 is a block diagram illustrating an electrical configuration of the looper 1. The looper 1 includes the CPU 10, a flash ROM 11, a RAM 12, an analog-digital converter (ADC) 13, the recording button 2, the loop reproduction button 3, the stop button 4, a sound source 14, and a digital signal processor 15 (hereinafter, referred to as a "DSP 15") that are connected to each other via a bus line 16. The DSP 15 is connected to the sound source 14 and a digital-analog converter (DAC) 17, the DAC 17 is connected to an amplifier 18, and the amplifier 18 is connected to the speaker S.

Figure 6:
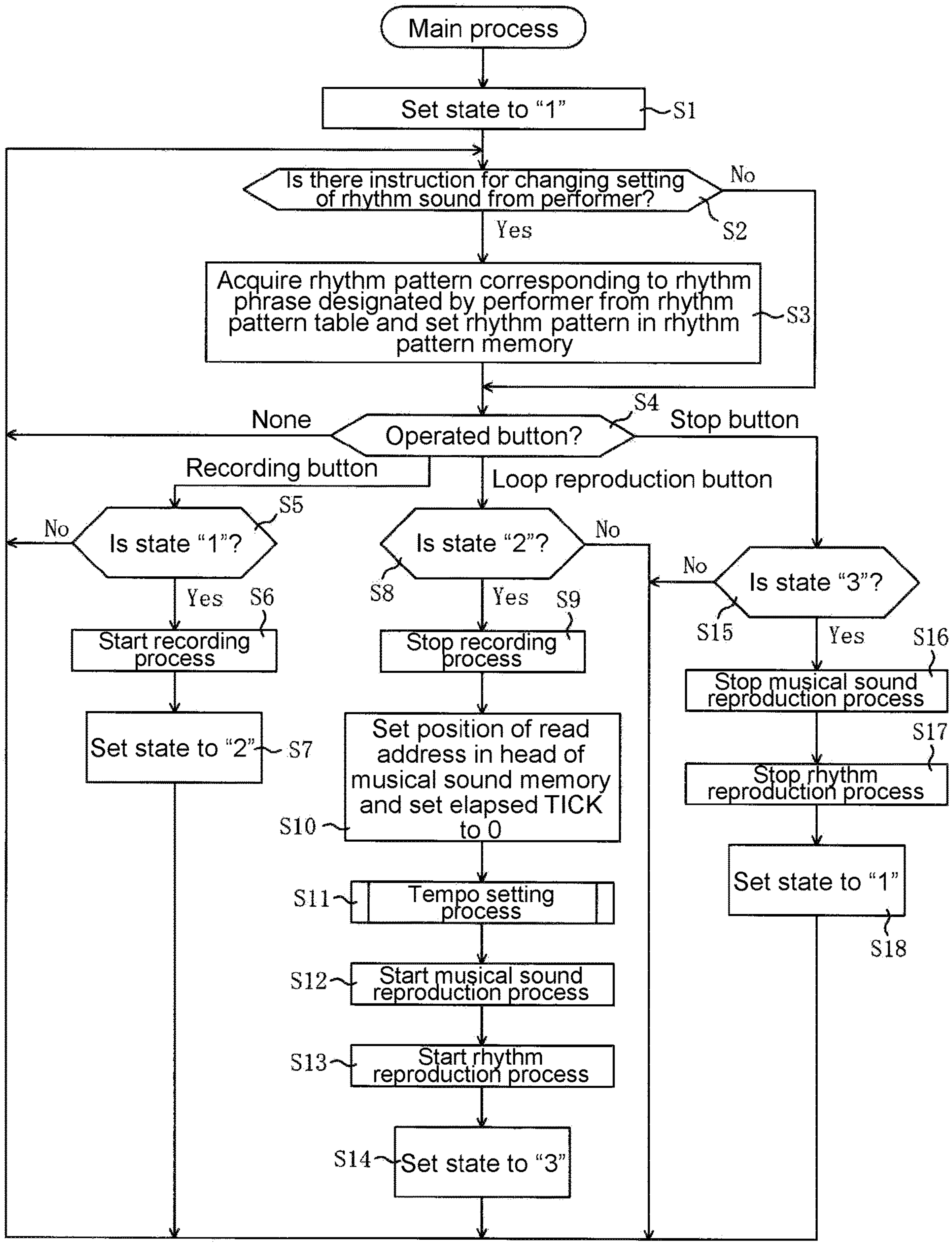
FIG. 6 is a flowchart illustrating a main process.

The CPU 10 is a calculation device that controls each part connected thereto via the bus line 16. The flash ROM 11 is a rewritable nonvolatile memory, and stores a control program 11*a*, a tempo table 11*b*, and a rhythm pattern table 11*c*. When the control program 11*a* is executed by the CPU 10, a main process in FIG. 6 is executed. The tempo table 11*b* is a data table that stores the number of bars and a tempo of the rhythm phrase R according to the phrase length T of the musical sound phrase P, and the rhythm pattern table 11*c* is a data table that stores a timing at which each tone in the rhythm phrase R is sounded. With reference to FIG. 5, the tempo table 11*b* and the rhythm pattern table 11*c* will be described.

FIG. 5(*a*) is a diagram schematically illustrating the tempo table 11*b*. As illustrated in FIG. 5(*a*), the tempo table 11*b* stores a combination of the number of bars and a tempo (unit: beats per minute (BPM)) according to the phrase length T. Specifically, the tempo table 11*b* stores a "time (seconds)" required for each combination of the number of bars and a tempo when the number of bars and a tempo are variously changed. The phrase length T of the musical sound phrase P is referred to from the tempo table 11*b*, and thus a combination of the number of bars and a tempo for a corresponding time is acquired.

For example, in a case where "11.85 seconds" is designated as the phrase length T of the musical sound phrase P, the number of bars "4" and the tempo "81" corresponding to "11.85 seconds" are acquired in the time of the tempo table 11*b*, and "81" is set as the tempo of the rhythm phrase R.

Meanwhile, in the tempo table 11*b*, there may be a plurality of combinations of the number of bars and tempos for a single time. For example, in the tempo table 11*b* in FIG. 5(*a*), as combinations of the number of bars and tempos corresponding to the time "12.00 seconds", the number of bars "4" and the tempo "80", the number of bars "6" and the tempo "120", and the number of bars "8" and the tempo "160" are stored. This is because the time changes variously depending on a combination of the number of bars and the tempo. Specifically, for the same tempo, if the number of bars increases, the time becomes longer, and for the same number of bars, if the tempo is fast, the time becomes shorter.

As described above, in a case where a plurality of combinations of the number of bars and tempos is acquired by referring to one phrase length T from the tempo table 11*b*, irrespective of the acquired tempo set as a tempo of the rhythm phrase R, a timing of the terminal end of the musical sound phrase P can be matched with a timing of the terminal end when the rhythm phrase R is repeated at the acquired tempo and by the acquired number of bars. In the present embodiment, in a case where a plurality of combinations of the number of bars and tempos is acquired from the tempo table 11*b*, the slowest acquired tempo is set as a tempo of the rhythm phrase R. Details of setting of a tempo will be described later.

FIG. 5(*b*) is a diagram schematically illustrating the rhythm pattern table 11*c*. In the present embodiment, the rhythm phrase R is formed of MIDI data. As illustrated in FIG. 5(*b*), the rhythm pattern table 11*c* stores a sounding timing of each tone of a high hat, a snare drum, a bass drum, or the like at each rhythm phrase R of Nos. 1, 2, . . . . Specifically, in the rhythm pattern table 11*c*, a tone sounded at a beat position and a TICK value corresponding to the beat position is designated in each rhythm phrase R. In FIG. 5(*b*), a black circle is marked on a beat position and a TICK value corresponding to a sounding timing of each tone.

For example, in the rhythm phrase R of "No. 1" in the rhythm pattern table 11*c*, the high hat and the bass drum are sounded at the beat position 1 (TICK value=0), the high hat and the snare drum are sounded at the beat position 2 (TICK value=96), only the high hat is sounded at the beat position 3 (TICK value=192), and the high hat and the snare drum are sounded at the beat position 4 (TICK value=288). The TICK value=383 is a timing of the terminal end of the rhythm phrase R of "No. 1", and thus "(terminal end)" is recorded in each tone. Since the rhythm phrase R of "No. 1" is formed of four beats, its length is set to "one bar". A MIDI message of a tone with a sounding timing is transmitted to the sound source 14 that will be described later at each timing (TICK value), and thus the rhythm phrase R is reproduced.

The rhythm pattern table 11*c* does not store only the rhythm phrase R having a length of one bar, but stores the rhythm phrase R having a length of four bars such as the rhythm phrase R of "No. 10", and the rhythm phrases R having lengths of other numbers of bars. Hereinafter, information related to a sounding timing of each rhythm phrase R as shown in the rhythm pattern table 11*c* will be referred to as a "rhythm pattern".

FIG. 4 will be referred to again. The RAM 12 is a memory that stores various work data, flags, or the like in a rewritable manner when the CPU 10 executes a program such as the control program 11*a*, and is provided with a musical sound memory 12*a* that stores musical sounds, a rhythm pattern memory 12*b* that stores the rhythm pattern, and a tempo memory 12*c* that stores a tempo of the rhythm phrase R.

The ADC 13 is a device that converts an electrical signal (analog signal) that is input from a musical apparatus such as the electric guitar G into a digital signal (for example, 16 bits). The sound source 14 is a device that outputs waveform data according to performance information (MIDI message) such as the rhythm phrase R that is input from the CPU 10.

The DSP 15 is a calculation device that performs a calculation process on the waveform data that is input from the sound source 14 or the like. The DAC 17 is a conversion device that converts the waveform data that is input from the DSP 15 into analog waveform data, and the amplifier 18 is an amplification device that amplifies the analog waveform data that is output from the DAC 17 with a predetermined gain. The analog waveform data amplified by the amplifier 18 is output as musical sounds from the speaker S.

Next, a process executed by the CPU 10 of the looper 1 will be described with reference to FIGS. 6 to 8. FIG. 6 is a flowchart illustrating the main process. The main process is a process executed after the looper 1 is powered on. In the main process, first, a state is set to "1" (S1). The state is a value indicating an operation state of the looper 1, and, in the present embodiment, "1" indicating a standby state of recording of musical sounds, "2" indicating that the musical sounds are being recorded, and "3" indicating that the musical sound phrase P and the rhythm phrase R are being loop-reproduced are provided. In the process in S1 performed immediately after the power is supplied, the state is set to "1" (recording standby) as an initial value of the operation state of the looper 1.

After the process in S1, it is checked whether there is an instruction for changing a setting of the rhythm phrase R from the performer H (S2). Specifically, it is checked whether a rhythm pattern different from a rhythm pattern stored in the rhythm pattern memory 12*b* has been set by using a rhythm setting change button (not illustrated) of the looper 1. Also in a case where a rhythm pattern is initially set by using the rhythm setting change button immediately after the looper 1 is powered on, it is regarded that there is an instruction for changing a setting of the rhythm phrase R from the performer H.

In a case where there is an instruction for changing a setting of the rhythm phrase R from the performer H in the process in S2 (S2: Yes), a rhythm pattern designated by the performer H is acquired from the rhythm pattern table 11*c* and is set in the rhythm pattern memory 12*b* (S3). On the other hand, in a case where there is no instruction for changing a setting of the rhythm phrase R from the performer H in the process in S2 (S2: No), the process in S3 is skipped.

After the processes in S2 and S3, it is checked whether the recording button 2, the loop reproduction button 3, or the stop button 4 has been operated (S4). In a case where the recording button 2 has been operated in the process in S4 (S4: "recording button"), it is checked whether the state is "1" (S5). In a case where the state is "1" in the process in S5 (S5: Yes), a recording process in FIG. 7(*a*) is started (S6), and the state is set to "2" (during recording) (S7). Here, with reference to FIG. 7(*a*), the recording process started due to the process in S6 will be described.

Figure 7B:
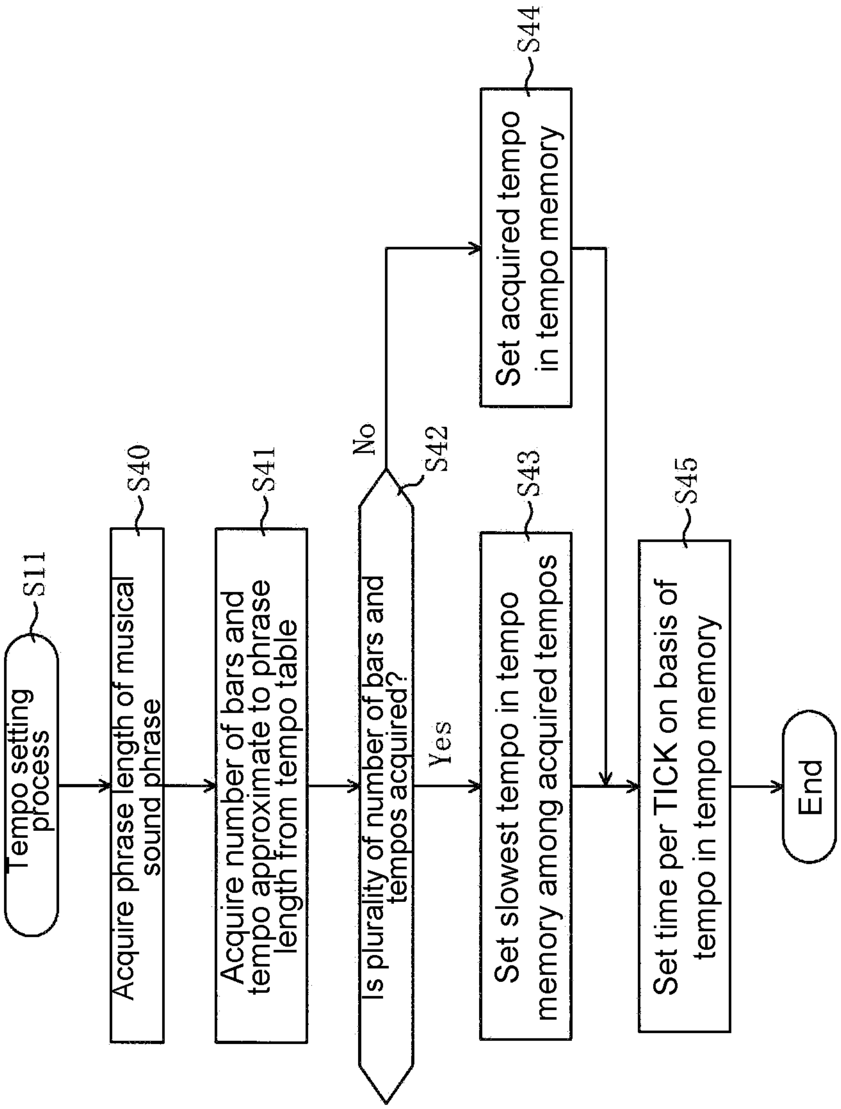
FIG. 7(*a*) is a flowchart illustrating a recording process, and FIG. 7(*b*) is a flowchart illustrating a tempo setting process.
Figure 7A:
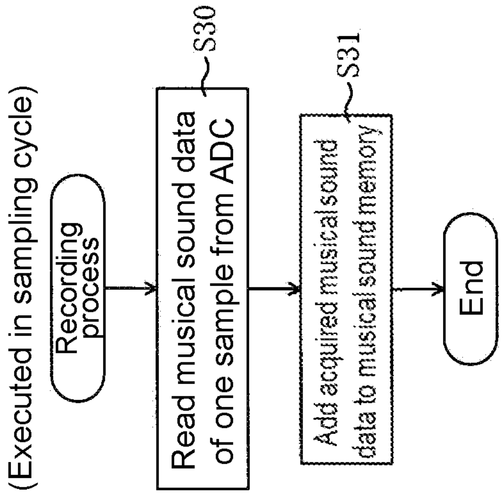

FIG. 7(*a*) is a flowchart illustrating the recording process. The recording process is an interruption process in a sampling cycle of the musical sound phrase P, that is, every 1/44100 seconds until there is an instruction for stopping the recording process due to a process in S9 (FIG. 6) that will be described later after an instruction for starting the recording process due to the process in S6 described above.

In the recording process, musical sound data of one sample is read from the ADC 13 (S30), and the read musical sound data is added to the musical sound memory 12*a* (S31). The processes in S30 and S31 are repeatedly performed every 1/44100 seconds, and thus the musical sound phrase P that is input from the electric guitar G or the like is stored (recorded) in the musical sound memory 12*a* in the sampling cycle of 44100 Hz. The musical sound data acquired from the ADC 13 in the process in S30 is transmitted to the DSP 15 at the same time as recording of the musical sound phrase P in the process in S31. Consequently, the musical sound phrase P that is being recorded is output from the speaker S. After the process in S31, the recording process is finished.

FIG. 6 will be referred to again. In a case where the state is not "1" in the process in S5 (S5: No), this indicates that the recording button 2 has been operated during recording or during loop reproduction, and thus the processes in S6 and S7 are skipped in order to prevent unintended recording of musical sounds.

In a case where the loop reproduction button 3 is operated in the process in S4 (S4: "loop reproduction button"), it is checked whether the state is "2" (during recording) (S8). In a case where the state is "2" in the process in S8 (S8: Yes), the recording process (FIG. 7(*a*)) is stopped (S9). Consequently, recording of musical sounds in the musical sound memory 12*a* due to the recording process started in the process in S6 is stopped.

After the process in S9, a read address indicating a reading position of the musical sound data in the musical sound memory 12*a* is set in the head of the musical sound memory 12*a* in a musical sound reproduction process that will be described later in FIG. 8(*a*), and an elapsed TICK used as a TICK value is set to 0 in a rhythm reproduction process that will be described later in FIG. 8(*b*) (S10). Consequently, loop reproduction of the musical sound phrase P and the rhythm phrase R due to the musical sound reproduction process and the rhythm reproduction process is started from the beginning (starting end) of each thereof.

After the process in S10, a tempo setting process (S11) is performed. Here, the tempo setting process will be described with reference to FIG. 7(*b*).

FIG. 7(*b*) is a flowchart illustrating the tempo setting process. The tempo setting process is a process in which a tempo of the rhythm phrase R is acquired on the basis of the phrase length T of the musical sound phrase P in the musical sound memory 12*a*, and a time per TICK is further set on the basis of the acquired tempo.

In the tempo setting process, first, the phrase length T of the musical sound phrase P stored in the musical sound memory 12*a* is acquired (S40). After the process in S40, a combination of the number of bars and a tempo corresponding to a time approximate to the phrase length T is acquired by referring to the tempo table 11*b* by using the phrase length T (S41). In this case, in a case where there is a plurality of combinations of the number of bars and tempos corresponding to the phrase length T when the phrase length T is "12.00 seconds" described above in FIG. 5(*a*), all of the corresponding combinations of the number of bars and tempos are acquired.

After the process in S41, it is checked whether a plurality of combinations of the number of bars and tempos is acquired (S42). In a case where a plurality of combinations of the number of bars and tempos is acquired in the process in S42 (S42: Yes), the slowest tempo is set in the tempo memory 12*c* among the acquired combinations of the number of bars and tempos (S43). On the other hand, in a case where there is a single combination of the number of bars and a tempo (S42: No), the acquired tempo is set in the tempo memory 12*c* (S44).

After the processes in S43 and S44, an actual time per TICK is set on the basis of the tempo in the tempo memory 12*c* (S45). Specifically, when the tempo in the tempo memory 12*c* is indicated by Tm, and a resolution on a time axis is indicated by TPQN, an actual time Tt per TICK is calculated according to the following Equation 1.

[Math. 1]

$$Tt=(60/Tm)/TPQN \quad \text{(Equation 1)}$$

That is, a value obtained by dividing 60 by the tempo Tm is further divided by the resolution TPQN, and a result thereof is obtained as the time Tt. In the present embodiment, the resolution TPQN is set to "96", but the resolution TPQN may be set to 96 or less, and may be set to 96 or more.

The time Tt calculated as described above is set as the actual time per TICK. Since the actual time per TICK is set according to the phrase length T of the musical sound phrase P, a length of the rhythm phrase R to be reproduced on the basis of the time can be set according to the phrase length T of the musical sound phrase P. After the process in S45, the tempo setting process is finished.

FIG. 6 will be referred to again. After the tempo setting process in S11, the musical sound reproduction process in FIG. 8(*a*) is started (S12), and the rhythm reproduction process in FIG. 8(*b*) is started (S13). Consequently, loop reproduction of the musical sound phrase P and the rhythm phrase R is started. Here, with reference to FIG. 8, the musical sound reproduction process started in the process in S12 and the rhythm reproduction process started in the process in S13 will be described.

Figure 8A:
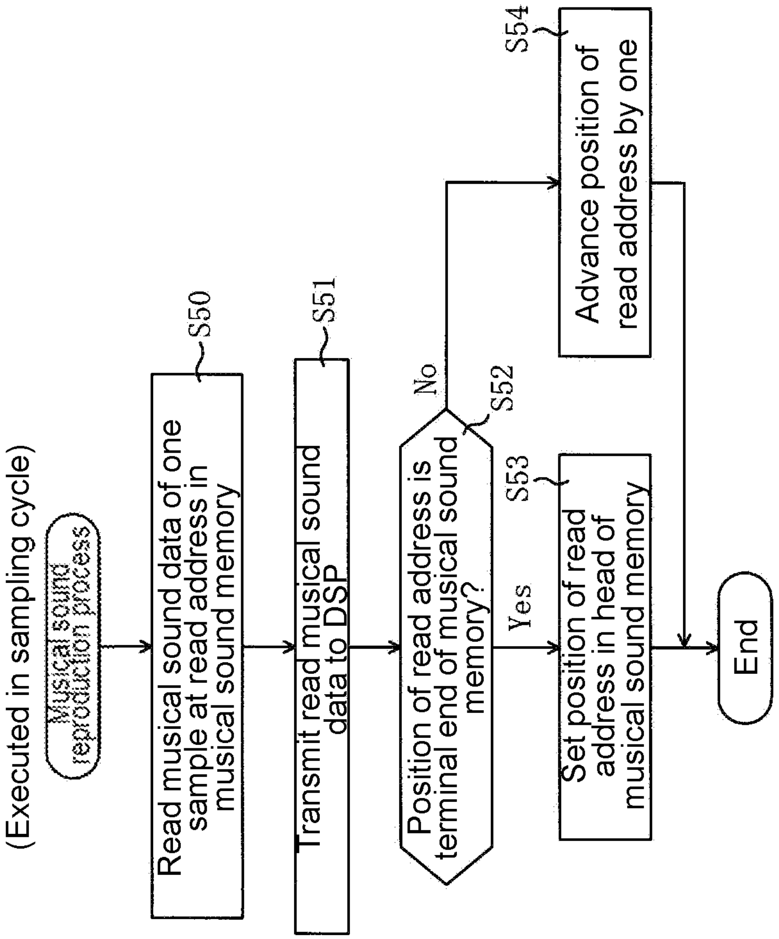
FIG. 8(*a*) is a flowchart illustrating a musical sound reproduction process, and FIG. 8(*b*) is a flowchart illustrating a rhythm reproduction process.
Figure 8B:
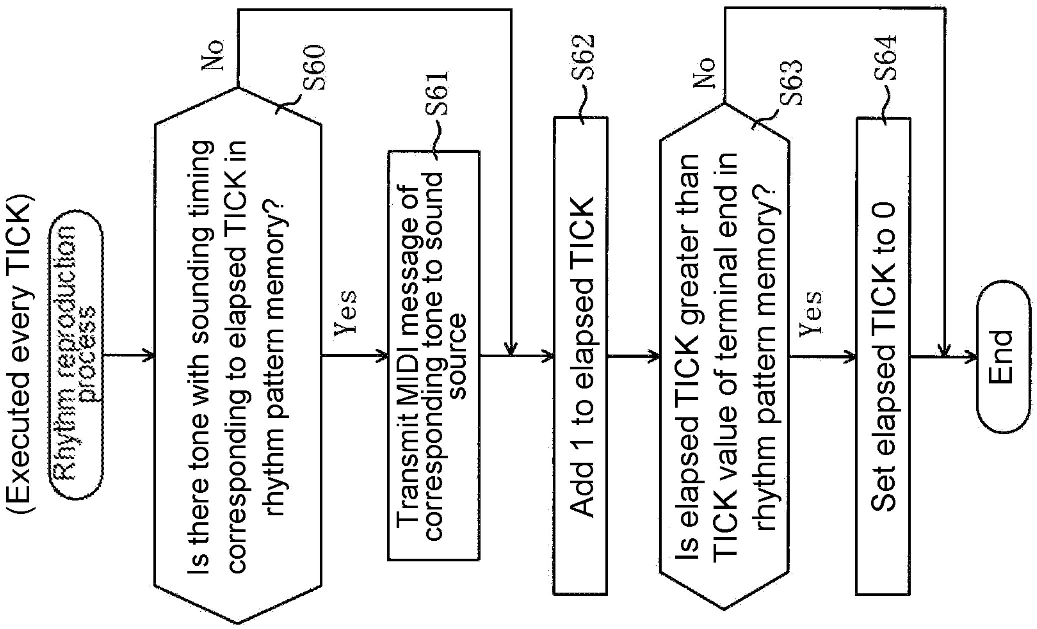

FIG. 8(*a*) is a flowchart illustrating the musical sound reproduction process. The musical sound reproduction process is an interruption process that is executed in a sampling cycle of the musical sound phrase P until there is an instruction for stopping the musical sound reproduction process due to a process in S16 (FIG. 6) that will be described later after an instruction for starting the musical sound reproduction process due to the process in S12 described above.

In the musical sound reproduction process, first, musical sound data of one sample at a read address in the musical sound memory 12*a* is read (S50), and the read musical sound data is transmitted to the DSP 15 (S51). The musical sound data transmitted to the DSP 15 is output as musical sounds from the speaker S connected to the DAC 17 via the DAC 17. The processes in S50 and S51 are executed every 1/44100 seconds, and thus the musical sound phrase P is output from the speaker S.

After the process in S51, it is checked whether a position of the read address is a position of musical sound data at the terminal end of the musical sound phrase P in the musical sound memory 12*a* (S52). In a case where a position of the read address is a position of musical sound data at the terminal end of the musical sound phrase P in the process in S52 (S52: Yes), the loop reproduction of the musical sound phrase P arrives at the terminal end of the musical sound phrase P, and thus a position of a read address is set to a head position of the musical sound memory 12*a* in order to read musical sound data at the head position of the musical sound memory 12*a* in the processes in S50 and S51 of the next musical sound reproduction process (S53).

On the other hand, in a case where a position of the read address is not a position of musical sound data at the terminal end of the musical sound phrase P in the process in S52 (S52: No), the loop reproduction of the musical sound phrase P does not arrive at the terminal end of the musical sound phrase P, and thus the position of the read address is advanced by one (S54). As described above, musical sound data of one sample is read and output in order from the beginning of the musical sound phrase P in the musical sound memory 12*a*, and, in a case where the terminal end of the musical sound phrase P is reached, the loop reproduction of the musical sound phrase P is realized by reading musical sound data from the beginning of the musical sound phrase P again. After the processes in S53 and S54, the musical sound reproduction process is finished.

Next, the rhythm reproduction process will be described. FIG. 8(*b*) is a flowchart illustrating the rhythm reproduction process. The rhythm reproduction process is an interruption process that is executed in the unit of time corresponding to one TICK until there is an instruction for stopping the rhythm reproduction process due to a process in S17 (FIG. 6) that will be described later after an instruction for starting the rhythm reproduction process due to the process in S13 described above. The rhythm reproduction process is executed immediately after the rhythm reproduction process is started in the process in S13 in FIG. 6. The rhythm reproduction process executed at such a timing is a rhythm reproduction process at a timing at which an elapsed TICK is "0".

In the rhythm reproduction process, first, it is checked whether there is a tone with a sounding timing corresponding to an elapsed TICK in a rhythm pattern in the rhythm pattern memory 12*b* (S60). Specifically, a TICK value (refer to FIG. 5(*b*)) in the rhythm pattern is referred to by using the elapsed TICK, and it is checked whether there is a tone (that is, the tone marked with the black circle in FIG. 5(*b*)) with the sounding timing at the TICK value corresponding to the elapsed TICK.

In a case where there is a tone with the sounding timing at the TICK value corresponding to the elapsed TICK in the rhythm pattern in the rhythm pattern memory 12*b* in the process in S60 (S60: Yes), a MIDI message of the corresponding tone is transmitted to the sound source 14 (S61). Waveform data corresponding to the transmitted MIDI message is acquired in the sound source 14, and the waveform data is output as musical sounds from the speaker S connected to the DAC 17 via the DSP 15 and the DAC 17. In this case, in a case where output of the musical sound phrase P due to the process in S51 and output of the rhythm phrase R due to the process in S61 overlap each other, the musical sound phrase P and the rhythm phrase R are mixed in the DSP 15 to be output.

As described above, the rhythm phrase R is output at a timing based on a TICK value. Here, as described in the tempo setting process in FIG. 7(*b*), a time per TICK is acquired on the basis of a tempo according to the phrase length T of the musical sound phrase P. Therefore, a length of the rhythm phrase R that is output on the basis of such a TICK value can be associated with the phrase length T of the musical sound phrase P. Thus, a timing of a certain terminal end of the rhythm phrase R that is loop-reproduced can be matched (synchronized) with a timing of any terminal end of the musical sound phrase P that is loop-reproduced in the same manner. According thereto, it is also possible to synchronize the start of reproduction of the rhythm phrase R with the start of the musical sound phrase P in loop reproduction immediately after the loop reproduction. Consequently, it is possible to perform loop reproduction of the musical sound phrase P and the rhythm phrase R, in which deviation between timings of the musical sound phrase P and the rhythm phrase R is reduced, and the audience feels less discomfort.

In a case where a plurality of combinations of the number of bars and tempos is acquired according to the phrase length T of the musical sound phrase P in the tempo setting process in FIG. 7(*b*), the slowest tempo is selected as a tempo used to set a time per TICK. Consequently, the time per TICK is the longest time according to the phrase length T of the musical sound phrase P. Therefore, it is possible to prevent a tempo of the rhythm phrase R from suddenly increasing.

In a case where there is no tone with the sounding timing at the TICK value corresponding to the elapsed TICK in the rhythm pattern in the rhythm pattern memory 12*b* in the process in S60 (S60: No), the process in S61 is skipped.

After the processes in S60 and S61, 1 is added to the elapsed TICK (S62). After the process in S62, it is checked whether the elapsed TICK is greater than a TICK value of the terminal end in the rhythm pattern memory 12*b* (S63). In a case where the elapsed TICK is greater than a TICK value of the terminal end in the rhythm pattern memory 12*b* in the process in S63 (S63: Yes), the terminal end of the rhythm pattern in the rhythm pattern memory 12*b* is reached, and thus the elapsed TICK is set to 0 (S64). Consequently, the rhythm phrase R based on the rhythm pattern in the rhythm pattern memory 12*b* is loop-reproduced.

In a case where the elapsed TICK is equal to or smaller than the TICK value of the terminal end in the rhythm pattern memory 12*b* in the process in S63 (S63: No), the process in S64 is skipped. After the processes in S63 and S64, the rhythm reproduction process is finished.

FIG. 6 will be referred to again. After the process in S13, the state is set to "3" (during loop reproduction) (S14). In a case where the state is not "2" in the process in S8 (S8: No), this indicates that the loop reproduction button 3 is operated during recording standby or loop reproduction, and thus the processes in S9 to S14 are skipped in order to prevent unintended loop reproduction of the musical sound phrase P and the rhythm phrase R.

In a case where the stop button 4 is operated in the process in S4 (S4: "stop button"), it is checked whether the state is "3" (S15). In a case where the state is "3" in the process in S15 (S15: Yes), the musical sound reproduction process is stopped (S16), and the rhythm reproduction process is stopped (S17). Consequently, the loop reproduction of the musical sound phrase P and the rhythm phrase R is stopped. After the process in S17, the state is set to "1" (recording standby) (S18). In a case where the state is not "3" in the process in S15 (S15: No), the processes in S16 to S18 are skipped.

In a case where none of the recording button 2, the loop reproduction button 3, and the stop button 4 is operated in the process in S4 (S4: "none"), or after the processes in S5, S7, S8, S14, S15, and S18, the processes in and after S2 are repeatedly performed.

As described above, in the looper 1 of the present embodiment, in a case where the recording button 2 is operated, recording of the musical sound phrase P is started. In this case, the musical sound phrase P that is being recorded is output from the speaker S.

Thereafter, in a case where the loop reproduction button 3 is operated, the recording of the musical sound phrase P is stopped and loop reproduction of the recorded musical sound phrase P and the rhythm phrase R is started. Consequently, after the input musical sound phrase P is output, musical sounds in which the musical sound phrase P and the rhythm phrase R are loop-reproduced can be output.

For example, in a case where the musical sound phrase P is based on a solo performance of the electric guitar G, first, the musical sound phrase P based on only the solo performance of the electric guitar G is output, and a melody line of the solo performance can be impressed on the audience. In the subsequent loop reproduction, heavy musical sounds in which the musical sound phrase P and the rhythm phrase R are superimposed are repeatedly output. Consequently, it is possible to easily output a variety of musical sounds based on the musical sound phrase P and the rhythm phrase R.

The phrase length T of the musical sound phrase P is a time until the loop reproduction button is operated after the recording button 2 is operated. Consequently, the recording button 2 and the loop reproduction button are operated at a timing desired by the performer H, and thus the musical sound phrase P having the phrase length T desired by the performer H can be easily recorded and loop-reproduced. Since such loop reproduction is stopped in a case where the stop button 4 is operated, the performer H operates the stop button 4 and can thus easily stop the loop reproduction at a timing desired by the performer H.

As mentioned above, the disclosure has been described on the basis of the embodiment, but it can be easily predicted that various alterations and changes are possible.

In the embodiment, in the tempo setting process in FIG. 7(*b*), in a case where a plurality of combinations of the number of bars and tempos is acquired due to the process in S41, the slowest tempo is selected as a tempo used to set a time per TICK. However, the disclosure is not limited thereto, and the fastest tempo may be set as a tempo used to set a time per TICK, and an intermediate tempo may be set as a tempo used to set a time per TICK. The performer H may preset which of the slowest tempo, the fastest tempo, and the intermediate tempo is used to set a time per TICK.

In the acquired combinations of the number of bars and tempos, a tempo corresponding to an even number of bars may be selected as a tempo used to set a time per TICK. Consequently, a length of the rhythm phrase R can be made to correspond to an even number of bars that are musically comfortable, and thus the rhythm phrase R can be obtained in which a sense of discomfort in hearing is reduced.

Figure 9A:
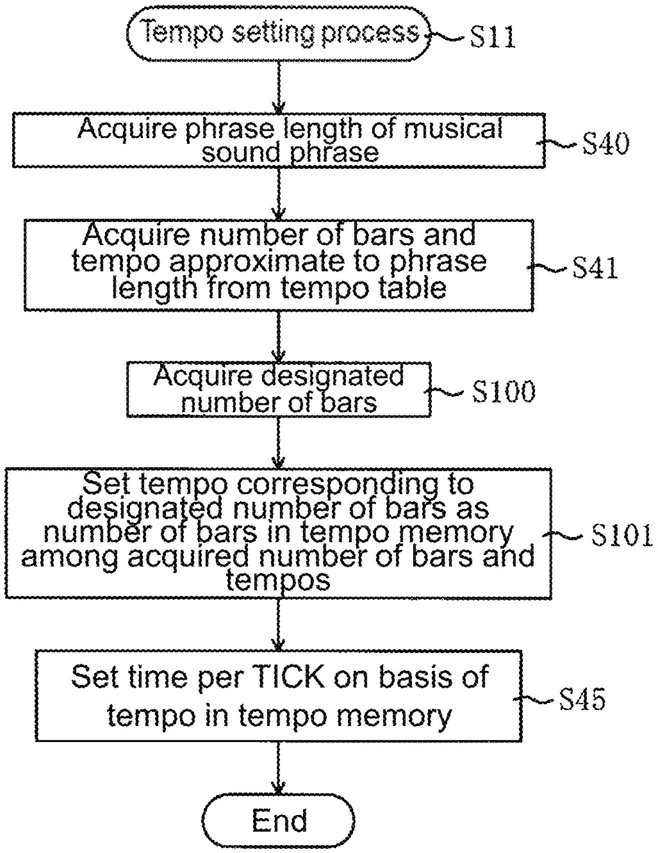
FIG. 9(*a*) is a flowchart illustrating a tempo setting process in a modification example, and FIG. 9(*b*) is a front view of a looper in the modification example.
Figure 9B:
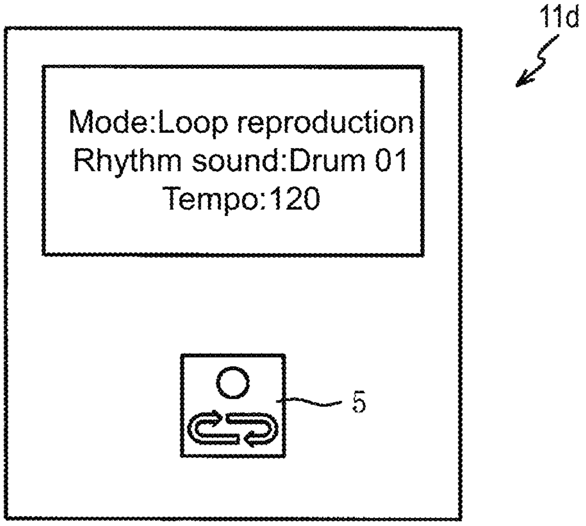

In the acquired combinations of the number of bars and tempos, a tempo corresponding to a designated number of bars that is the number of bars designated in advance by the performer H may be selected as a tempo used to set a time per TICK. Specifically, as shown in a tempo setting process in FIG. 9(*a*), after the process in S41, a designated number of bars that is set by the performer H by using a setting button (not illustrated) of the looper 1 is acquired (S100). After the process in S100, among the combinations of the number of bars and tempos acquired in the process in S41, a tempo corresponding to a designated number of bars as the number of bars is set in the tempo memory 12*c* (S101). After the process in S101, a process of setting a time per TICK due to the process in S45 may be executed.

Consequently, the musical sound phrase P corresponding to the designated number of bars is reproduced during reproduction of one rhythm phrase R. That is, the designated number of bars is regarded as the "number of duplicates" of the musical sound phrase P reproduced during reproduction of one rhythm phrase R, and a phrase obtained by connecting the musical sound phrases P duplicated by the "number of duplicates" during the reproduction of one rhythm phrase R to each other is regarded as a new musical sound phrase P', and the musical sound phrase P' is loop-reproduced.

For example, in a case where a default length (that is, the number of bars in FIG. 5(*b*)) of the rhythm pattern of the rhythm phrase R selected in the process in S3 in FIG. 6 is "four bars", and the phrase length T of the musical sound phrase P is equivalent to "one bar", the designated number of bars is set to "four", which is the same as the number of bars of the rhythm phrase R, and thus the musical sound phrase P' is formed of phrases having four bars obtained by connecting four musical sound phrases P each having one bar to each other. Consequently, in a case where the rhythm phrase R and the musical sound phrase P' are loop-reproduced, a timing of the terminal end of the rhythm phrase R and a timing of the terminal end of the musical sound phrase P' can be synchronized with each other.

As described above, since a designated number of bars is set to a default number of bars of the rhythm phrase R, it is not necessary to stop reproduction of the rhythm phrase R in the middle in accordance with a timing of the terminal end of the musical sound phrase P'. Consequently, since the entire default number of bars of the rhythm phrase R is reproduced, it is possible to easily realize loop reproduction of the musical sound phrase P' and the rhythm phrase R by using the rhythm phrase R in a mode desired by the performer H.

When the performer H sets a designated number of bars in advance, it is possible to output musical sounds in which the musical sound phrase P of the designated number of bars is reproduced, during loop reproduction of one rhythm phrase R without the performer H operating the looper 1 immediately after the performer H finishes recording of the musical sound phrase P. Consequently, it is possible to improve operability of the looper 1.

In the embodiment, the phrase length T of the musical sound phrase P is a time until the loop reproduction button 3 is operated after the recording button 2 is operated by the performer H. However, the disclosure is not limited thereto, and, for example, a time point until recording of musical sounds is actually stopped after the loop reproduction button 3 is operated may be adjusted such that the phrase length T is a length corresponding to any number of bars. In this case, instead of stopping the recording of musical sounds immediately after the loop reproduction button 3 is operated, a time point at which the recording button 2 is operated is set as the beginning of a certain bar, and the recording of musical sounds may be continued until a time point corresponding to the terminal end of any bar after the loop reproduction button 3 is operated.

More specifically, after the loop reproduction button 3 is operated, the recording of musical sounds may be stopped at a time point at which a time from an operation of the recording button 2 matches any time stored in the tempo table 11*b* (FIG. 5(*a*)), and loop reproduction of the musical sound phrase P based on the musical sounds may be started. Consequently, since the phrase length T of the musical sound phrase P matches a length of one or a plurality of bars, it is possible to reduce deviation in length between the musical sound phrase P and the rhythm phrase R having a length corresponding to a bar, and thus to realize loop reproduction without impairing musical expression.

The phrase length T is not limited to being adjusted to a length of any bar, and may be adjusted to a musically meaningful length such as a beat, and the phrase length T may be freely adjusted by the performer H.

Recording of musical sounds is stopped by operating the loop reproduction button 3, but the disclosure is not limited thereto, and the recording may be continued even when the loop reproduction button 3 is operated. In this case, the beginning of the musical sound phrase P may be set to a timing at which the recording button 2 is operated in the musical sound memory 12*a*, and the terminal end of the musical sound phrase P may be set to a timing at which the loop reproduction button 3 is operated.

In the embodiment, a combination of the number of bars and a tempo approximate to the phrase length T of the musical sound phrase P is acquired by referring to the tempo table 11*b*. However, the combination of the number of bars and a tempo is not limited to being acquired from the tempo table 11*b*, and may be acquired through computation. For example, a time in a case where the number of bars and a tempo are changed in various ways may be calculated, and a combination of the number of bars and the tempo in which the calculated time and the phrase length T are approximate may be acquired.

In the embodiment, the looper 1 is provided with the recording button 2, the loop reproduction button 3, and the stop button 4, and, in a case where the recording button 2 is operated, recording is started, in a case where the loop reproduction button 3 is operated, the recording is stopped and loop reproduction is started, and, in a case where the stop button 4 is operated, the loop reproduction is stopped. However, the disclosure is not limited thereto, and, as shown in a looper 11*d* in FIG. 9(*b*), the recording button 2, the loop reproduction button 3, and the stop button 4 may be omitted, a single instruction button 5 (operator) may be provided, and starting of recording, stopping of the recording and starting of loop reproduction, and stopping of the loop reproduction may be switched by operating the instruction button 5.

Figure 10:
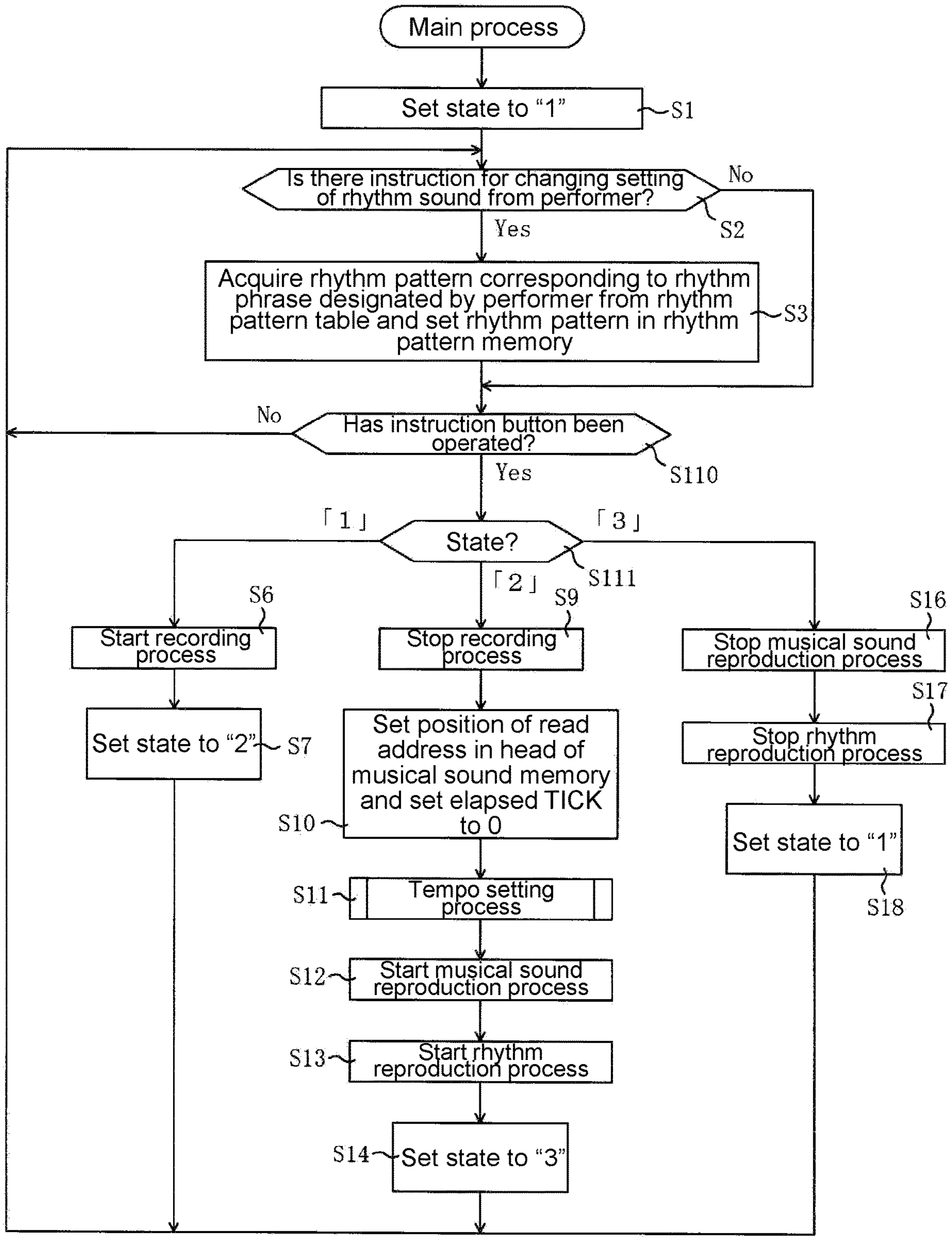
FIG. 10 is a flowchart illustrating a main process in the modification example.

In this case, as shown in a main process in FIG. 10, after the processes in S2 and S3, it is checked whether the instruction button 5 has been operated (S110), and, in a case where the instruction button 5 has been operated (S110: Yes), the state is checked (S111). In a case where the state is “1” in the process in S111 (S111: “1”), the processes in S6 and S7 are performed, in a case where the state is “2” in the process in S111 (S111: “2”), the processes in S9 to S14 and the subsequent processes are performed, and, in a case where the state is “3” (S111: “3”), the processes in S16 to S18 and the subsequent processes are performed. In a case where the instruction button 5 has not been operated (S110: No), the processes in and after S111 may be skipped. Consequently, starting of recording, stopping of the recording and starting of loop reproduction, and stopping of the loop reproduction can be switched by operating the same instruction button 5, and thus it is possible to improve operability of the looper 11*d*.

In the embodiment, the musical sound phrase P is formed of musical sound data that is input from the ADC 13, and the rhythm phrase R is formed of the rhythm pattern in the rhythm pattern table 11*c*. However, the disclosure is not limited thereto, and a MIDI device (not illustrated) may be connected to the looper 1, and the musical sound phrase P may be formed of MIDI data that is input from the MIDI device.

A communication device (not illustrated) may be provided in the looper 1, and the musical sound phrase P and the rhythm phrase R (or a rhythm pattern) may be acquired from a server or the like on a network connected thereto via the communication device. In this case, for example, musical sounds that are live-streamed on the network may be acquired, and the musical sound phrase P may be formed by storing and recording the acquired musical sounds in the musical sound memory 12*a*.

In the embodiment, the looper 1 has been exemplified as an electronic musical apparatus. However, the disclosure is not limited thereto, and may be applied to other electronic musical apparatuses such as electronic organs, electronic pianos, and electronic brass band apparatuses.

In the embodiment, there is a configuration in which the control program 11*a* is stored in the flash ROM 11 of the looper 1 and is operated on the looper 1. However, the disclosure is not necessarily limited thereto, and the control program 11*a* may be operated on other computers such as a personal computer (PC), a mobile phone, a smartphone, and a tablet terminal.

The numerical values given in the embodiment are examples, and other numerical values may be naturally employed.

What is claimed is:

1. An electronic musical apparatus that records an input guitar sound phrase and reproduces the guitar sound phrase and a rhythm phrase formed of MIDI data, the electronic musical apparatus comprising:
- a processor configured to:
  - sequentially acquire a first timing based on an input timing of a first instruction and a second timing based on an input timing of a second instruction after the first timing; and
  - at the first timing, start to record guitar sounds input from a guitar, and, at the second timing, determine a phrase based on the guitar sounds recorded from the first timing to the second timing as the guitar sound phrase, start to reproduce the rhythm phrase from a beginning of the rhythm phrase simultaneously with starting to reproduce the guitar sound phrase from a beginning of the guitar sound phrase, and output the reproduced rhythm phrase and the reproduced guitar sound phrase to a speaker.

2. The electronic musical apparatus according to claim 1, wherein
- the processor sets a tempo of the rhythm phrase such that a timing of an end of the reproduced guitar sound phrase matches a timing of an end of the reproduced rhythm phrase.

3. The electronic musical apparatus according to claim 1, wherein the processor loop-reproduces the guitar sound phrase from the beginning of the guitar sound phrase to an end of the guitar sound phrase after reproduction of the guitar sound phrase is started.

4. The electronic musical apparatus according to claim 1, wherein
- the processor designates a number of duplicates,
- wherein the processor determines, as the guitar sound phrase, a second phrase obtained by duplicating the phrase based on the guitar sounds recorded from the first timing to the second timing by the designated number of duplicates and connecting the duplicated phrases to each other.

5. The electronic musical apparatus according to claim 1, wherein the processor acquires, as the second timing, a musical timing after the input timing of the second instruction.

6. The electronic musical apparatus according to claim 5, wherein the musical timing is a timing of an end of a bar or a beat.

7. The electronic musical apparatus according to claim 1, wherein the first instruction and the second instruction are input through an operation on the same operator.

8. The electronic musical apparatus according to claim 1, wherein the processor acquires a phrase length of the guitar sound phrase, and acquires a combination of a number of bars and a tempo such that a time required for the combination of the number of bars and the tempo is approximate to the phrase length of the guitar sound phrase.

9. The electronic musical apparatus according to claim 8, wherein, in a case where a plurality of the combinations of the number of bars and tempos is acquired, the processor sets, as a tempo of the rhythm phrase, a slowest tempo among the plurality of acquired combinations of the number of bars and tempos.

10. A storage medium storing a recording/reproduction program causing a computer to record an input guitar sound phrase and reproduce the guitar sound phrase and a rhythm phrase formed of MIDI data, the recording/reproduction program causing the computer to execute:
- a timing acquisition step of sequentially acquiring a first timing based on an input timing of a first instruction and a second timing based on an input timing of a second instruction after the first timing; and
- a recording/reproduction control step of, at the first timing acquired in the timing acquisition step, starting to record guitar sounds input from a guitar, and, at the second timing acquired in the timing acquisition step, determining a phrase based on the guitar sounds recorded from the first timing to the second timing as the guitar sound phrase, and starting to reproduce the rhythm phrase from a beginning of the rhythm phrase simultaneously with starting to reproduce the guitar sound phrase from a beginning of the guitar sound phrase, and outputting the reproduced rhythm phrase and the reproduced guitar sound phrase to a speaker.

11. A recording/reproduction method of recording an input guitar sound phrase and reproducing the guitar sound phrase and a rhythm phrase which is a rhythm pattern or MIDI data at a tempo, the recording/reproduction method comprising:
- according to a first operation, starting to record guitar sounds input from a guitar, and, according to a second operation, determining a phrase based on the guitar sounds recorded from the first operation to the second operation as the guitar sound phrase, starting to reproduce the rhythm phrase from a beginning of the rhythm phrase simultaneously with starting to reproduce the guitar sound phrase from a beginning of the guitar sound phrase, and outputting the reproduced rhythm phrase and the reproduced guitar sound phrase to a speaker.

12. The recording/reproduction method according to claim 11,
- wherein a tempo of the rhythm phrase is set such that a timing of an end of the reproduced guitar sound phrase matches a timing of an end of the reproduced rhythm phrase.

13. The recording/reproduction method according to claim 11,
- wherein the guitar sound phrase is loop-reproduced from the beginning of the guitar sound phrase to an end of the guitar sound phrase after reproduction of the guitar sound phrase is started.

14. The recording/reproduction method according to claim 11,
- wherein a number of duplicates is designated, and
- wherein a phrase obtained by duplicating the phrase based on the guitar sounds recorded from the first operation to the second operation by the designated number of duplicates and connecting the duplicated phrases to each other is determined as the guitar sound phrase.

15. The recording/reproduction method according to claim 11,
- wherein a musical timing after the second operation is acquired as a timing of the second operation.

16. The recording/reproduction method according to claim 15,
- wherein the musical timing is a timing of an end of a bar or a beat.

17. The recording/reproduction method according to claim 11, wherein the first operation and the second operation are input through an operation on the same operator.

18. The recording/reproduction method according to claim 11, wherein a phrase length of the guitar sound phrase is acquired, and a combination of the number of bars and a tempo corresponding to a time approximate to the phrase length of the guitar sound phrase is acquired.

* * * * *